(12) United States Patent
Tamaru

(10) Patent No.: US 8,849,012 B2
(45) Date of Patent: Sep. 30, 2014

(54) IMAGE PROCESSING APPARATUS AND METHOD AND COMPUTER READABLE MEDIUM HAVING A PROGRAM FOR PROCESSING STEREOSCOPIC IMAGE

(75) Inventor: Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 631 days.

(21) Appl. No.: 13/052,734

(22) Filed: Mar. 21, 2011

(65) Prior Publication Data

US 2011/0243384 A1 Oct. 6, 2011

(30) Foreign Application Priority Data

Mar. 30, 2010 (JP) .................................. 2010-077387

(51) Int. Cl.
| | |
|---|---|
| *G06K 9/00* | (2006.01) |
| *G06T 5/00* | (2006.01) |
| *H04N 13/04* | (2006.01) |
| *H04N 13/00* | (2006.01) |

(52) U.S. Cl.
CPC ........ *H04N 13/0022* (2013.01); *H04N 13/0434* (2013.01); *H04N 13/0404* (2013.01); *G06T 5/006* (2013.01); *G06T 2207/10028* (2013.01); *H04N 13/0409* (2013.01); *H04N 2013/0081* (2013.01); *H04N 13/0431* (2013.01)
USPC .......................................... 382/154; 345/419

(58) Field of Classification Search
CPC .................. G06T 7/0075; G06T 2207/10012; G06T 19/00; G06T 17/20; H04N 13/0239
USPC .............. 345/419; 348/42, 43, 46, 47, 51, 99, 348/208, 345, 419; 382/118, 154, 284; 386/248; 396/20, 104
See application file for complete search history.

(56) References Cited

U.S. PATENT DOCUMENTS

| | | | | |
|---|---|---|---|---|
| 5,937,212 | A * | 8/1999 | Kurahashi et al. | 396/20 |
| 6,198,484 | B1 * | 3/2001 | Kameyama | 345/419 |
| 6,263,164 | B1 * | 7/2001 | Nakahara et al. | 396/104 |
| 6,381,360 | B1 * | 4/2002 | Sogawa | 382/154 |
| 6,549,650 | B1 * | 4/2003 | Ishikawa et al. | 382/154 |
| 7,417,664 | B2 * | 8/2008 | Tomita | 348/43 |
| 7,469,074 | B2 * | 12/2008 | Adams et al. | 382/284 |
| 8,085,997 | B2 * | 12/2011 | Tanaka et al. | 382/118 |
| 8,106,995 | B2 * | 1/2012 | Tamaru | 348/345 |

(Continued)

FOREIGN PATENT DOCUMENTS

| | | |
|---|---|---|
| JP | 09-192349 A | 7/1997 |
| JP | 10-090814 A | 4/1998 |
| JP | 2004-129186 A | 4/2004 |

*Primary Examiner* — Vikkram Bali
*Assistant Examiner* — Xuemei Chen
(74) *Attorney, Agent, or Firm* — Sughrue Mion, PLLC

(57) ABSTRACT

There are provided an image processing apparatus, a method, and a program capable of appropriately adjusting the stereoscopic effect in a stereoscopic image with a person. The attention point serving as the provisional cross point position is set to a person's eye, and the cross point position is shifted backwards from the attention point as the percentage of the image occupied by the face increases, thereby adjusting the stereoscopic effect so as to increase an area of the object which is projected forward from the cross point. Regarding the calculation of the back shift amount, the back shift amount is set to increase as the percentage of the face occupied in the standard image increases, and the coefficient is set to be smaller as the number of pixels of the positions nearer than the attention point increases, and the set coefficient kb is multiplied by the back shift amount.

9 Claims, 13 Drawing Sheets

(56) References Cited

U.S. PATENT DOCUMENTS

| | | | |
|---|---|---|---|
| 8,284,264 B2* | 10/2012 | Tamaru et al. | 348/208.99 |
| 8,369,607 B2* | 2/2013 | Mashitani et al. | 382/154 |
| 8,411,931 B2* | 4/2013 | Zhou et al. | 382/154 |
| 8,472,786 B2* | 6/2013 | Kusuda | 386/248 |
| 2011/0018968 A1* | 1/2011 | Shikata et al. | 348/47 |
| 2011/0018972 A1* | 1/2011 | Pan | 348/47 |
| 2011/0063421 A1* | 3/2011 | Kubota | 348/52 |
| 2011/0064299 A1* | 3/2011 | Zhang et al. | 382/154 |
| 2011/0074928 A1* | 3/2011 | Misawa | 348/47 |
| 2011/0228051 A1* | 9/2011 | Dedeoglu et al. | 348/46 |
| 2011/0242273 A1* | 10/2011 | Shimaya | 348/36 |
| 2011/0316984 A1* | 12/2011 | Akeley et al. | 348/51 |
| 2011/0316985 A1* | 12/2011 | Ishikawa et al. | 348/51 |
| 2012/0008856 A1* | 1/2012 | Hewes et al. | 382/154 |
| 2012/0019532 A1* | 1/2012 | Yanagita et al. | 345/419 |
| 2012/0044327 A1* | 2/2012 | Horita et al. | 348/47 |
| 2012/0154390 A1* | 6/2012 | Narita et al. | 345/419 |
| 2012/0182403 A1* | 7/2012 | Lange | 348/51 |
| 2012/0218392 A1* | 8/2012 | Fujinami | 348/51 |
| 2012/0320163 A1* | 12/2012 | Yahagi | 348/47 |
| 2013/0021435 A1* | 1/2013 | Yamashita et al. | 348/42 |
| 2013/0027391 A1* | 1/2013 | Lin et al. | 345/419 |
| 2013/0038699 A1* | 2/2013 | Hayashi | 348/47 |
| 2013/0051660 A1* | 2/2013 | Shibuhisa et al. | 382/154 |
| 2013/0083174 A1* | 4/2013 | Sakurabu | 348/51 |
| 2013/0100257 A1* | 4/2013 | Sawachi | 348/49 |
| 2013/0113793 A1* | 5/2013 | Uchida | 345/419 |
| 2013/0113892 A1* | 5/2013 | Nakamaru | 348/47 |
| 2013/0169633 A1* | 7/2013 | Hattori et al. | 345/419 |
| 2013/0170737 A1* | 7/2013 | Arita et al. | 382/154 |

* cited by examiner

LEFT IMAGE GL

LEFT IMAGE GL

LEFT IMAGE GL

LEFT IMAGE GL

WEIGHTING COEFFICIENT kc

LEFT IMAGE GL

LEFT IMAGE GL

LEFT IMAGE GL

IMAGE PROCESSING APPARATUS AND METHOD AND COMPUTER READABLE MEDIUM HAVING A PROGRAM FOR PROCESSING STEREOSCOPIC IMAGE

BACKGROUND OF THE INVENTION

1. Field of the Invention

The present invention relates to an image processing apparatus and an image processing method capable of generating a stereoscopic image, which is stereoscopically displayed on the display section for stereoscopic display, by performing 3D processing for stereoscopic display on plural images which are viewed from different observation points. In addition, the invention also relates to a program for causing a computer to execute the image processing method.

2. Description of the Related Art

Recently, there have been known methods capable of realizing stereoscopic visualization by using parallax. In such methods, plural images, which are acquired by photographing a same object from different positions, are combined, such that a stereoscopic image is generated, thereby stereoscopically displaying the generated stereoscopic image. As a specific method for the stereoscopic display, a naked-eye parallel viewing method that performs the stereoscopic display by arranging plural images is known. Further, it is also possible to perform the stereoscopic display by using a stereoscopic image which is generated in a way of synthesizing plural images by setting colors of plural images as different colors such as red and blue and superimposing them or by making the polarization directions of plural images different and superimposing them. In this case, by viewing the combined stereoscopic image, which is stereoscopically displayed, with image separation glasses such as red/cyan glasses or polarization glasses, it is possible to perform stereoscopic viewing (the anaglyph system, and the polarization filter system).

Further, even when polarization glasses or the like are not used, like in the parallax barrier system and the lenticular system, it is possible to perform stereoscopic viewing by displaying plural images on a stereoscopic display monitor capable of stereoscopic viewing. In this case, the plural images are cut out in a striped shape in the vertical direction and arranged in a staggered manner, such that the stereoscopic image is generated, thereby performing the stereoscopic display. Further, a system has been also proposed that performs the stereoscopic display on the basis of the afterimage effect in a way of alternately displaying left and right images at a high speed while changing the ray propagation direction of the left and right images by using the image separation glasses or attaching an optical element to a liquid crystal display (scan backlight system).

As described above, in the case of the stereoscopic viewing, it is necessary to appropriately adjust the stereoscopic effect. Hence, there has been proposed a method of generating a stereoscopic image in accordance with a parallax amount which is adjusted in response to a instruction to adjust the parallax amount of the stereoscopic image stereoscopically displayed (refer to JP2004-129186A and JP2009-129420A). Further, a method has been also proposed of generating a stereoscopic image by adjusting the stereoscopic effect while viewing the displayed stereoscopic image (refer to JP1998-90814A (JP H10-90814A)). Furthermore, there has been also proposed a method of adjusting the stereoscopic effect for games (refer to JP 1997-192349A (JP H9-192349A)).

SUMMARY OF THE INVENTION

The above-mentioned adjustment of the stereoscopic effect is specifically performed by matching a cross point, which is an intersection position between the lines of sight, with an attention point of an object.

In a case where a person is present in the image, it is preferable to set the position of the person's face as the cross point. Further, by setting particularly the position of the eye in the face as the cross point, it is possible to obtain a highly desirable image in that the person's eye is emphasized as the attention point.

However, in a case where the percentage of the image occupied by the face is large, for example, in a case where the face is photographed in close-up, when the cross point is matched with the position of the eye, only a part of an object, which is nearer than the eye, such as the nose or forelock is projected forward, and the entire remainder of the object is located behind. Thus, there is a problem in that the image has an insufficient stereoscopic effect.

The invention has been made in consideration of the above situation, and its object is to appropriately adjust the stereoscopic effect in a stereoscopic image with a person.

According to an aspect of the invention, there is an image processing apparatus that generates a stereoscopic image by performing parallax adjustment on plural images which are viewed from different observation points, the image processing apparatus including: a face detection section that detects a face from each image; an attention point detection section that detects a prescribed attention point serving as a provisional cross point position from the face; and a cross-point position adjustment section that shifts the cross point position backwards from the attention point as the percentage of the image occupied by the face increases. Here, "shifts the cross point position backwards from the attention point" means that the cross point position is shifted in a direction to be further separated from the imaging means for photographing an image.

According to the aspect of the invention, it is preferable that the image processing apparatus should further include a distance calculation section that calculates a distance in a depth direction on the basis of a parallax amount between the plural images for each pixel of the images. In addition, it is also preferable that the cross-point position adjustment section should have a back-shift adjustment section which performs adjustment to reduce the amount of shifting back as the number of pixels of positions nearer than the attention point increases.

In this case, it is preferable that the back-shift adjustment section should give more weight to the pixel which is closer to the center of the image when determining the number of pixels of the positions nearer than the attention point. Alternatively, it is preferable that the back-shift adjustment section should give more weight to a pixel which is closer to the center of the face when determining the number of pixels of the positions nearer than the attention point.

Further, it is preferable that the attention point should be at an eye. In addition, it is more preferable that the attention point should be at the farther eye in the backward direction among the left and the right eyes.

According to another aspect of the invention, there is an image processing method of setting a prescribed point, which corresponds to each of plural images viewed from different observation points, as a cross point and generating a stereoscopic image by performing parallax adjustment on the plural images so as to minimize parallax at a position of the corresponding cross point. The image processing method includes the steps of: detecting a face from each image; detecting a prescribed attention point serving as a provisional cross point position from the face; and shifting the cross point position backwards from the attention point as the percentage of the image occupied by the face increase.

In addition, there may be provided a program for causing a computer to execute the image processing method according to the aspect of the invention.

According to the aspect of the invention, in the stereoscopic image with a person, the attention point serving as the provisional cross point position is set to an object such as an eye in the face, and the cross point position is shifted backwards from the attention point as the percentage of the image occupied by the face increases, thereby adjusting the stereoscopic effect so as to increase an area of the object which is projected forward from the cross point. Therefore, it is possible to obtain an appropriate stereoscopic image which has a high stereoscopic effect without causing a sense of discomfort and visual strain.

Here, when the adjustment is made to reduce the amount of shifting back as the number of pixels of the positions nearer than the attention point increases, it is possible to prevent the area of the object projected forward from the attention point from becoming excessively large. Hence, it is possible to obtain an appropriate stereoscopic image which does not cause a sense of discomfort and visual strain.

In this case, when the number of pixels of the positions nearer than the attention point is determined, the pixel, which is closer to the center of the image, is more weighted, or the pixel, which is closer to the center of the face, is more weighted. In such a manner, it is possible to obtain an appropriate stereoscopic image which is better than a stereoscopic image in the case where arrangement of the object is considered.

Further, when the attention point is set to the eye, the person's eye is emphasized as the attention point, and thus it is possible to obtain a highly desirable image. In this case, when the attention point is set to the farther eye of the left and right eyes, the area of the object projected forward more increases, and thus it is possible to obtain a stereoscopic image which has a more sufficient stereoscopic effect.

DESCRIPTION OF THE PREFERRED EMBODIMENTS

Figure 1:
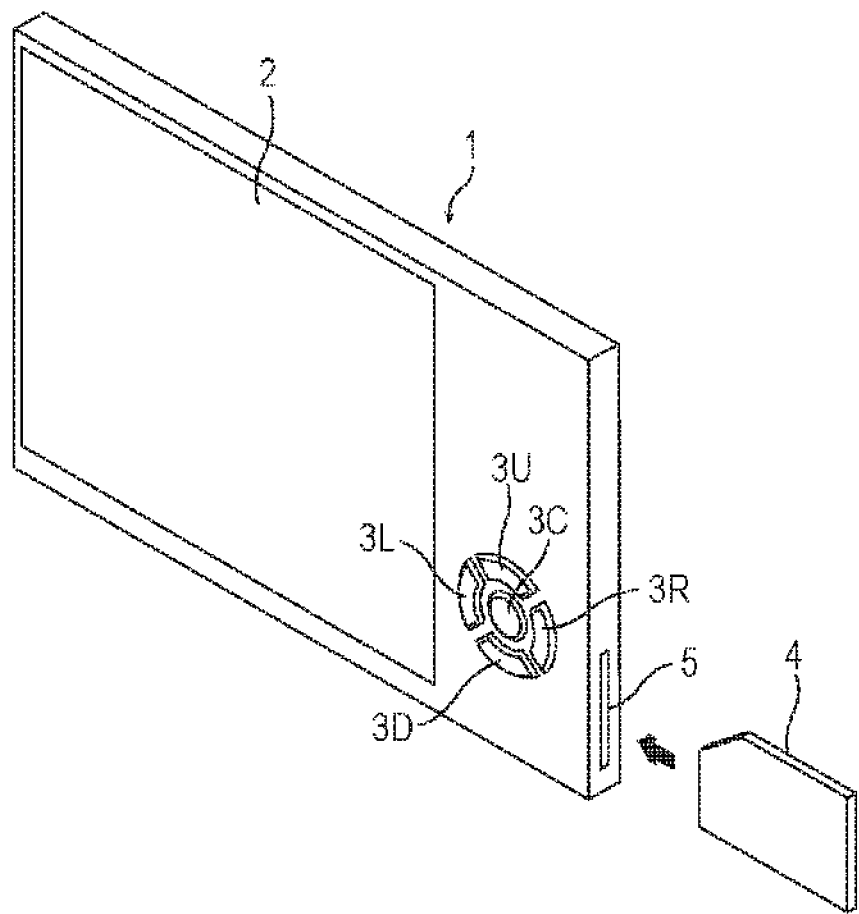
FIG. 1 is a perspective view illustrating an external configuration of an image processing apparatus according to a first embodiment of the invention.
Figure 2:
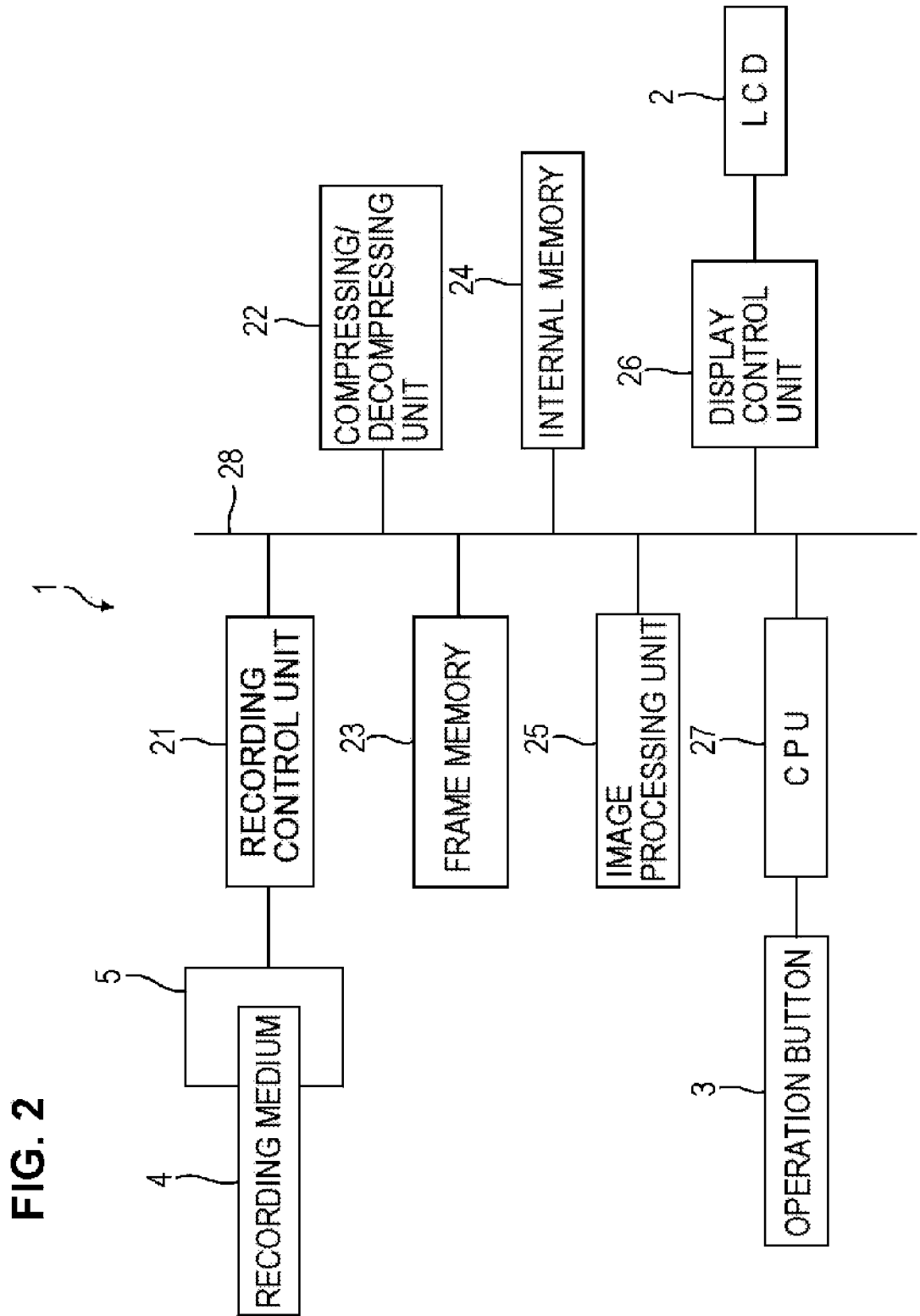
FIG. 2 is a schematic block diagram illustrating an internal configuration of the image processing apparatus according to the first embodiment.

Hereinafter, embodiments of the invention will be described with reference to the accompanying drawings. FIG. 1 is a perspective view illustrating an external configuration of an image processing apparatus according to a first embodiment of the invention. FIG. 2 is a schematic block diagram illustrating an internal configuration of the image processing apparatus according to the first embodiment.

As shown in FIG. 1, the image processing apparatus 1 according to the first embodiment includes a liquid crystal display (LCD) 2 and operation buttons 3 which are formed on the front face thereof. Further, the image processing apparatus 1 also includes a slot 5 which is formed on the side face thereof and to which a recording medium 4 such as a memory card is inserted. Then, the image processing apparatus 1 according to the first embodiment is configured to display the stereoscopic image, which is stored in a recording medium 4 and is generated from plural images acquired by photographing at mutually different positions, on an LCD 2. Note that, in the embodiment, a description will be given under the assumption that the stereoscopic display is performed by using two images GL and GR. Further, it is assumed that, at the time of the stereoscopic display, the image GL is an image for the left eye and the image GR is an image for the right eye.

The operation buttons 3 include an upper button 3U, a lower button 3D, a left button 3L, a right button 3R, and a center button 3C.

As shown in FIG. 2, the image processing apparatus 1 includes a recording control section 21, a compression/expansion processing section 22, a frame memory 23, an internal memory 24, an image processing section 25, a display control section 26, and a CPU 27.

The recording control section 21 performs control to store and read information in and from the recording medium 4 which is inserted into the slot 5.

The compression/expansion processing section 22 performs compression and decompression of the two images GL and GR, which are read out from the recording medium 4, for the stereoscopic display. Tags, which contain ancillary information such as shooting date and time and the stereoscopic effect adjustment value to be described later, are assigned to the image files of the images GL and GR, on the basis of Exif format or the like.

The frame memory 23 is a work memory used in performing various kinds of processing, which includes the 3D processing to be described later, on the image data representing the images GL and GR.

The internal memory 24 stores: a various constant numbers, which are set in the image processing apparatus 1; a program, which is executed by the CPU 27; and the like.

The image processing section 25 generates a stereoscopic image by performing the 3D processing on the images GL and GR in order to stereoscopically display the images GL and GR on the LCD 2. Here, as a stereoscopic display system according to the embodiment, a heretofore known optional system may be used. For example, usable systems are as follows: a system that perform stereoscopic viewing through the naked-eye parallel viewing method of displaying the images GL and GR by arranging them side by side; and a lenticular system that realizes stereoscopic display in a way of displaying the images GL and GR at prescribed positions on the display screen of the LCD 2, to which a lenticular lens is attached, so as to respectively make the images GL and GR incident to the left and right eyes. Further, another usable system is a parallax barrier system. The system realizes stereoscopic display in a way of displaying the images GL and GR at prescribed positions on the display screen of the LCD 2, to which a parallax barrier for changing an optical path to the left and right eyes is attached, so as to respectively make the images GL and GR incident to the left and right eyes.

Further, other usable systems are systems (an anaglyph system and a polarization filter system) that realize the stereoscopic display in a way of synthesizing the images GL and GR by setting the colors of the images GL and GR as different colors such as red and blue and superimposing them or by making the polarization directions of the images GL and GR different and superimposing them. Moreover, another usable system is a scan backlight system. The system realizes stereoscopic display in a way of alternately separating the optical path of the back light of the LCD 2 so as to make them correspond to the left and right eyes and alternately displaying the images GL and GR on the display screen of the LCD 2 in accordance with the separation into the left and right of the back light.

In addition, the LCD 2 is processed to correspond to the system of the 3D processing which is performed by the image processing section 25. For example, in the case where the stereoscopic display system is a lenticular system, a lenticular lens is provided on the display screen of the LCD 2. In addition, in the case of the parallax barrier system, the parallax barrier is provided on the surface of the LCD 2. Further, in the case of the scan backlight system, an optical element for changing the ray propagation directions of the left and right images is provided on the display screen of the LCD 2.

Further, the image processing section 25 has the functions of: a distance calculation section that calculates a distance in the depth direction on the basis of a parallax amount between the plural images for each pixel of the images; a face detection section that detects a face from each image; a attention point detection section that detects a prescribed attention point serving as a provisional cross point position from the face; a cross-point position adjustment section that shifts the cross point position backwards from the attention point as the percentage of the image occupied by the face increases; a 3D processing section that generates a stereoscopic image by performing the 3D processing on the plural images so as to minimize the parallax at the cross point position. Besides, the image processing section 25 is able to perform image processing such as color correction, sharpness correction, grayscale correction, and processing for performing an adjustment of white balance on the images GL and GR as necessary.

The display control section 26 stereoscopically displays a stereoscopic image acquired through the 3D processing or two-dimensionally displays the images GL and GR.

The CPU 27 controls the respective sections of the image processing apparatus 1 in response to the instructions issued from the operation buttons 3.

The data bus 28 is connected to the respective sections constituting the image processing apparatus 1 and the CPU 27, and thus exchanges various data and various information in the image processing apparatus 1.

Figure 3:
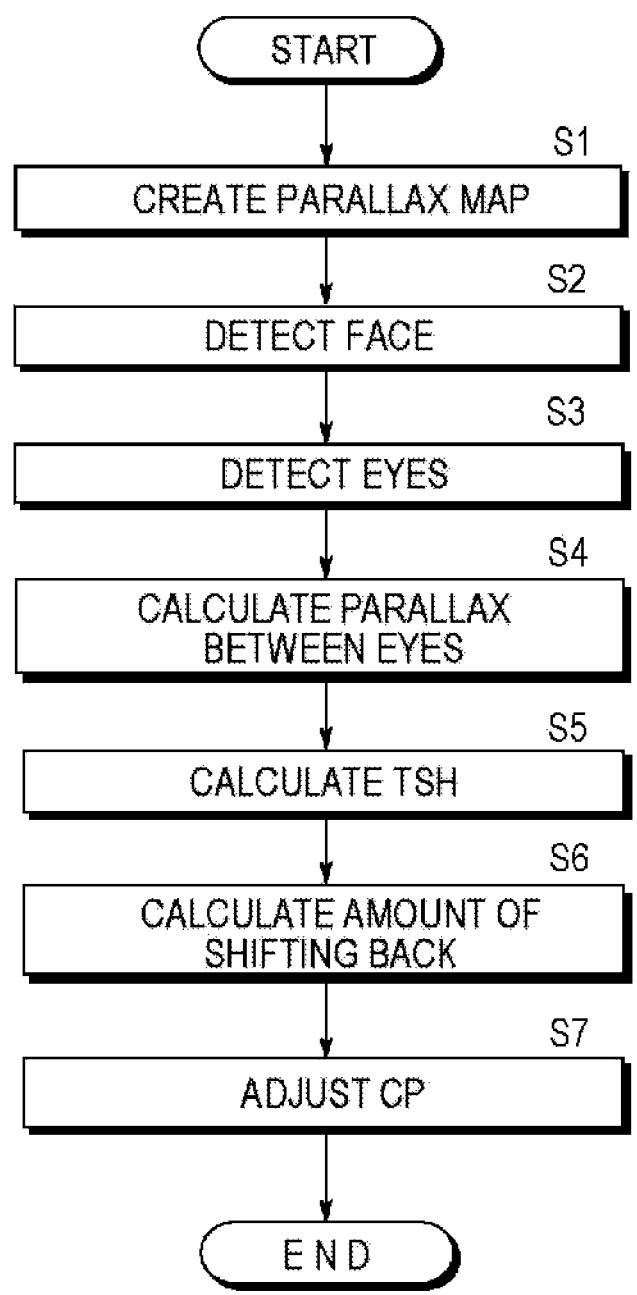
FIG. 3 is a flowchart illustrating processing which is performed at the time of adjusting the stereoscopic effect in the first embodiment.
Figure 4:
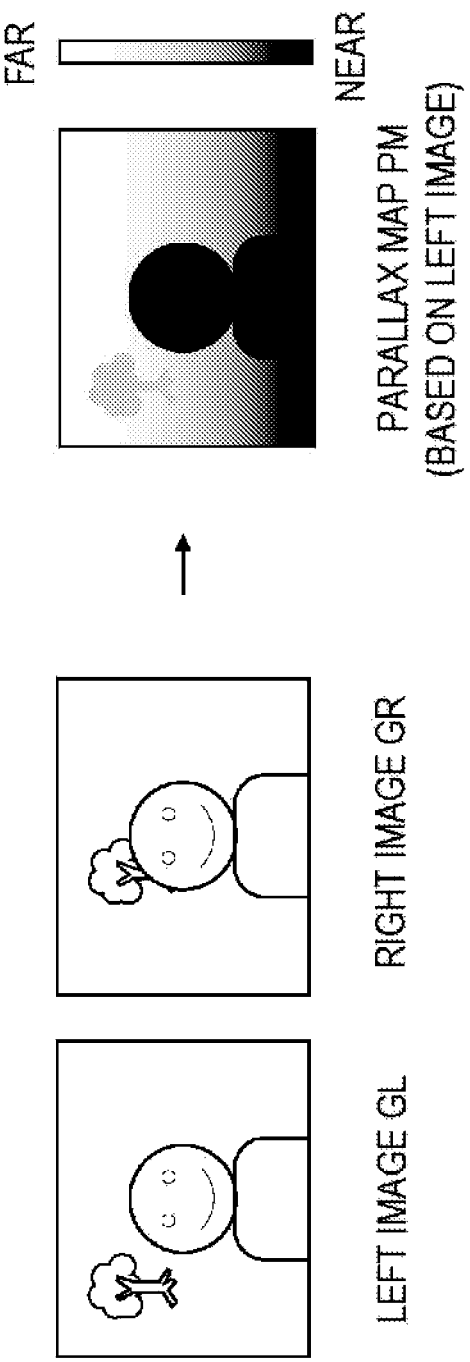
FIG. 4 is a diagram illustrating a parallax amount between the left and right images (1).
Figure 5:
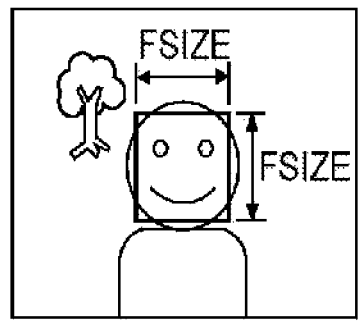
FIG. 5 is a diagram illustrating an example of a display image (1).
Figure 6A:
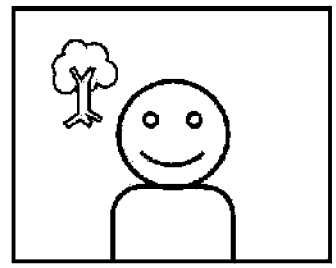
FIGS. 6A and 6B are diagrams illustrating an example of a display image (2).
Figure 6B:
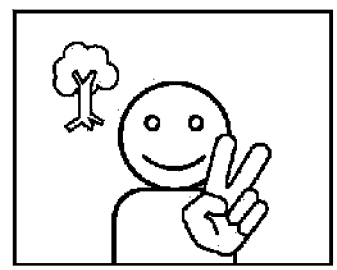
Figure 7A:
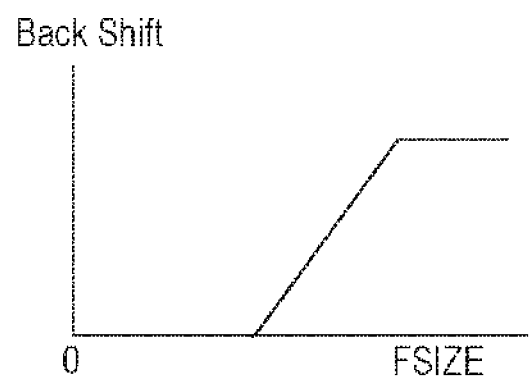
FIGS. 7A and 7B are explanatory diagrams of the case of adjusting the back shift amount on the basis of the size of the face.
Figure 7B:
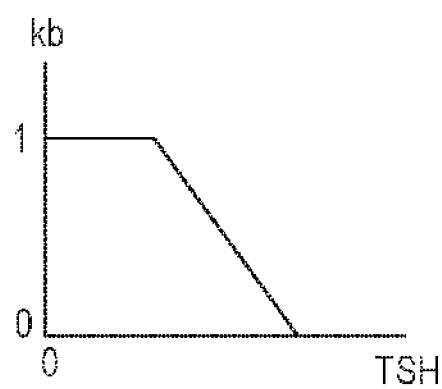

Next, the processing in the first embodiment will be described. FIG. 3 is a flowchart illustrating processing which is performed at the time of adjusting the stereoscopic effect in the first embodiment. FIG. 4 is a diagram illustrating a parallax amount between the left and right images (1). FIG. 5 is a diagram illustrating an example of a display image (1). FIGS. 6A and 6B are diagrams illustrating an example of a display image (2). FIGS. 7A and 7B are explanatory diagrams of the case of adjusting the back shift amount on the basis of the size of the face.

The image processing apparatus 1 according to the first embodiment is configured to set a person's eye as an attention point in a stereoscopic image with the person and adjust the position of the cross point on the basis of the eye position. Here, a description will be given of the case where a lenticular system is employed as a stereoscopic display system.

The two images GL and GR for generating a stereoscopic image are acquired by photographing a same object at different positions. Hence, when the images GL and GR are superimposed, the object included in the images GL and GR has a predetermined parallax amount. Thus, first, as shown in FIG. 4, a parallax map PM is created on the basis of the images GL and GR (step S1). The parallax map PM represents a parallax for each pixel in terms of a luminance when any one of the images GL and GR is set as a standard. In the embodiment, the left image GL is set as a standard image, and display is performed at a higher luminance as the parallax is larger. However, the invention is not limited to the embodiment.

Thereafter, as shown in FIG. 5, the position and size of the face in the left image GL, which is set as the standard image, are detected (step S2), and an eye (the attention point) as a provisional cross point position is detected from the detected face (step S3). In addition, as the method of detecting the face and the eye in the image, any method may be used.

Next, the parallax of the eye in the image is calculated on the basis of the parallax map PM (step S4). In addition, regarding the position for determining the parallax of the eye, any position may be used as a reference. For example, the position may be the center of any one of both eyes, the center of the line which connects the centers of both eyes, or the like.

Then, on the basis of the parallax map PM, the number of pixels TSH of positions nearer than the attention point in the image is calculated (step S5). Even in the case of an image in which the percentage of the face is large such as an image in which a person's face is photographed in close-up, as shown in FIG. 6A, there may be no principal object at a position nearer than the attention point (in the embodiment, the person's eye) in the image. In contrast, as shown in FIG. 6B, there may be a principal object (the hand partially displayed in the image) at a position nearer than the attention point (in the embodiment, the person's eye) in the image, that is, the number of pixels TSH of the positions nearer than the attention point as the cross point may be large. In this case, it is possible to obtain a sufficient stereoscopic effect even when the person's eye (the attention point) is set as the position of the cross point. Hence, in order to prevent the position of the cross point from being shifted back too far from the eye (the attention point), the above-mentioned step is provided.

Here, when the number of pixels TSH of the positions nearer than the attention point is determined, the weight of each pixel may be changed for each pixel position. Hereinafter, such an example will be described.

Figure 8A:
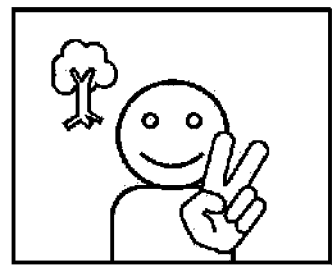
FIGS. 8A and 8B are diagrams illustrating an example of a display image (3).
Figure 8B:
Figure 9:
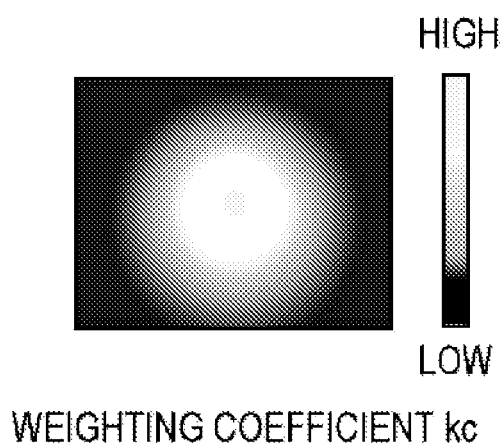
FIG. 9 is an explanatory diagram of the case of adjusting a weighting coefficient for each pixel (1).

For example, the weight of the pixel may be set to be higher the closer the pixel is to the center of the image. FIGS. 8A and 8B are diagrams illustrating an example of a display image (3). FIG. 9 is an explanatory diagram of the case of adjusting a weighting coefficient for each pixel (1).

Regarding an object located nearer than the attention point, the following cases may be considered: as shown in FIG. 8A, the object is photographed in the vicinity of the center of the image (the hand which is partially displayed in the drawing); or as shown in FIG. 8B, the object is photographed in the vicinity of the edge of the image (the leaf in the drawing). Even in this case, when TSH is calculated by setting a higher weighting coefficient kc to the pixel closer to the center of the image as shown in FIG. 9 and accumulating the pixel number which is obtained by multiplying the coefficient kc for each pixel, it is possible to obtain an appropriate stereoscopic image which is better than that in the case where arrangement of the object is considered.

Figure 10A:
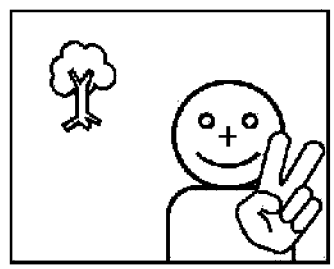
FIGS. 10A and 10B are diagrams illustrating an example of a display image (4).
Figure 10B:
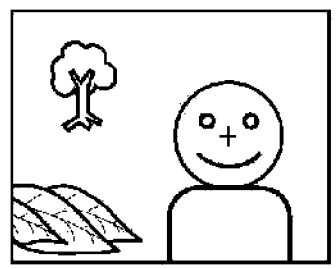
Figure 11:
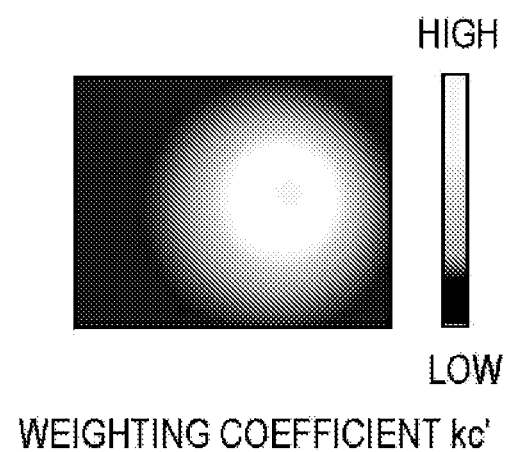
FIG. 11 is an explanatory diagram of the case of adjusting a weighting coefficient for each pixel (2).

Further, the weight of the pixel may be set to be higher as the pixel is closer to the center of the face. FIGS. 10A and 10B are diagrams illustrating an example of a display image (4). FIG. 11 is an explanatory diagram of the case of adjusting a weighting coefficient for each pixel (2).

Regarding an object located nearer than the attention point, the following cases may be considered: as shown in FIG. 10A, the object is photographed in the vicinity of the center of the face (the hand which is partially displayed in the drawing); or as shown in FIG. 10B, the object is photographed at a position apart from the center of the face (the leaf in the drawing). Even in this case, when TSH is calculated by setting a higher weighting coefficient kc' to the pixel closer to the center of the face as shown in FIG. 11 and accumulating the pixel number which is obtained by multiplying the coefficient kc' for each pixel, it is possible to obtain an appropriate stereoscopic image which is better than that in the case where arrangement of the object is considered.

Next, as shown in FIG. 5, on the basis of the percentage of the face which is occupied in the left image GL set as the standard image, an amount (a back shift amount) of shifting the cross point position backwards from the eye (the attention point) is calculated (step S6).

Regarding the calculation of the back shift amount, as shown in FIG. 7A, it is preferable that the back shift amount BS should be set to increase as the percentage (FSIZE) of the face, which is occupied in the left image GL set as the standard image, becomes larger. Moreover, as shown in FIG. 7B, the coefficient kb is set to be smaller as the number of pixels TSH of the positions nearer than the attention point increases, and the set coefficient kb is multiplied by the back shift amount BS.

Then, the cross point position is shifted backwards from the eye (the attention point) as the above set back shift amount BS increases, and the 3D processing is performed (step S7).

In the embodiment, the lenticular system is employed as the stereoscopic display system, and thus the parallax adjustment of the two images GL and GR is made through the 3D processing.

Specifically, in the processing, assuming that the parallax amount of the eye position is EP, the back shift amount is BS, and the coefficient by which the back shift amount is multiplied is kb, the final image shift amount CPP is calculated by the following Expression (1). Here, it is preferable to shift the display position of the right image GR on the LCD 2 in the leftward direction by the calculated CPP.

$$CPP = EP + BS \times kb \quad (1)$$

In addition, when a system other than the lenticular system is employed as the stereoscopic display system, it is preferable to appropriately change processing in accordance with each system such that a principal object is set as the cross point.

Finally, the stereoscopic image generated in the above-mentioned manner is displayed on the LCD 2, and the processing ends.

With such a configuration, even in the case of an image in which the percentage of the face is large such as an image in which a person's face is photographed in close up, it is possible to obtain an appropriate stereoscopic image which has a high stereoscopic effect without causing a sense of discomfort and visual strain.

Figure 12:
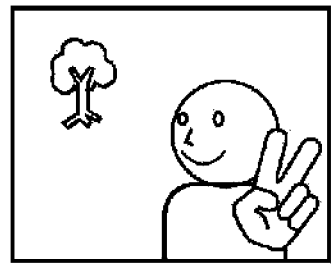
FIG. 12 is a diagram illustrating an example of a display image (5).
Figure 13:
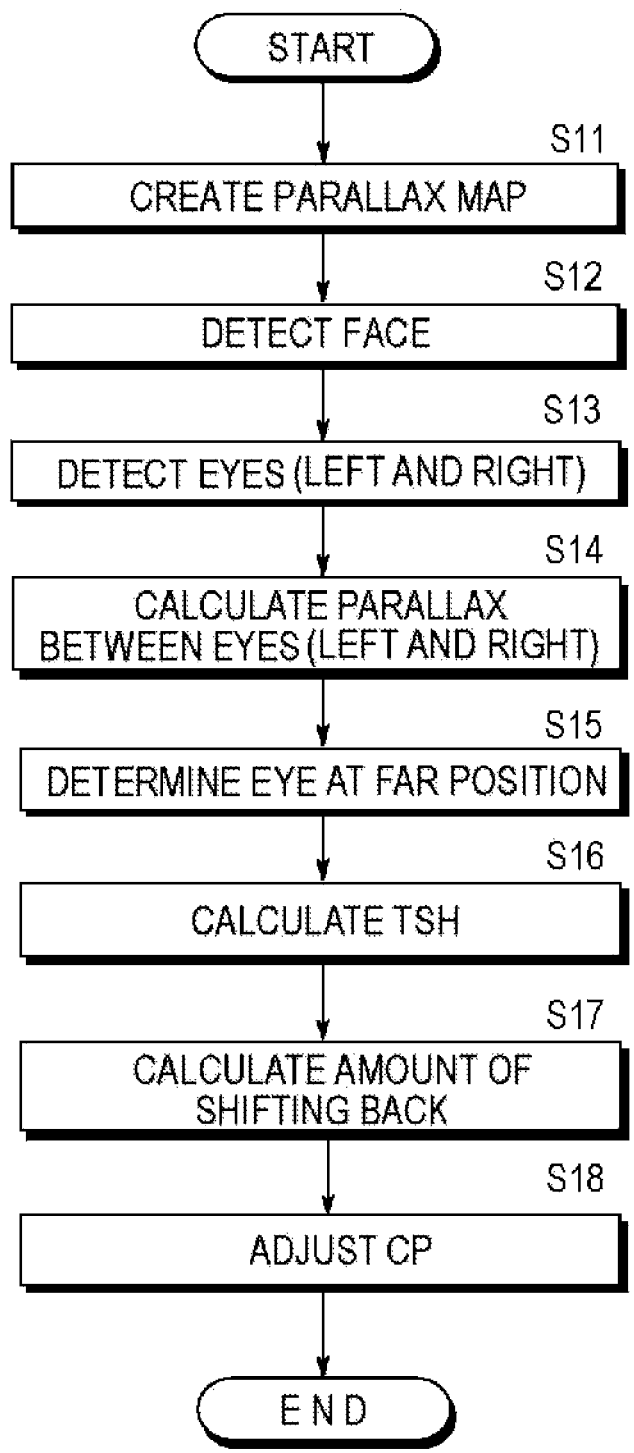
FIG. 13 is a flowchart illustrating a process which is performed at the time of adjusting the stereoscopic effect in the second embodiment.

Next, a second embodiment of the invention will be described. In addition, the image processing apparatus according to the second embodiment has the same configuration as the image processing apparatus according to the first embodiment, and only the processing performed therein is different. Hence, a detailed description of the configuration will be omitted herein. FIG. 12 is a diagram illustrating an example of a display image (5). FIG. 13 is a flowchart illustrating a process which is performed at the time of adjusting the stereoscopic effect in the second embodiment.

The image processing apparatus 1 according to the second embodiment is, as shown in FIG. 12, configured to set the farther eye of the left and right eyes of a person as the attention point in a stereoscopic image with a person's face turned and adjust a position of the cross point on the basis of the eye position. Here, a description will be given of the case where a lenticular system is employed as a stereoscopic display system.

The two images GL and GR for generating a stereoscopic image are acquired by photographing a same object at different positions. Hence, when the images GL and GR are superimposed, the object included in the images GL and GR has a predetermined parallax amount. Thus, first, as shown in FIG. 4, a parallax map PM is created on the basis of the images GL and GR (step S11). The parallax map PM represents a parallax amount for each pixel in terms of a luminance when any one of the images GL and GR is set as a standard. In the embodiment, the left image GL is set as a standard image, and display is performed at a higher luminance as the parallax amount is larger. However, the invention is not limited to the embodiment.

Thereafter, the position and size of the face in the left image GL, which is set as the standard image, are detected (step S12), and an eye (the attention point) as a provisional cross point position is detected from the detected face (step S13). In addition, as the method of detecting the face and the eye in the image, any method may be used.

Next, the parallax of the eye in the image is calculated on the basis of the parallax map PM (step S14). The farther eye is specified, and the specified eye is set as the attention point (step S15).

Then, on the basis of the parallax map PM, the number of pixels TSH of positions nearer than the attention point in the image is calculated (step S16). Here, similarly to the first embodiment, when the number of pixels TSH of the positions nearer than the attention point is determined, the weight of each pixel may be changed for each pixel position.

Next, on the basis of the percentage of the face which is occupied in the left image GL set as the standard image, an amount (a back shift amount) of shifting the cross point position backwards from the eye (the attention point) is calculated (step S17).

Regarding the calculation of the back shift amount, as shown in FIG. 7A, it is preferable that the back shift amount BS should be set to increase as the percentage (FSIZE) of the face, which is occupied in the left image GL set as the standard image, becomes larger. Moreover, as shown in FIG. 7B, the coefficient kb is set to be smaller as the number of pixels TSH of the positions nearer than the attention point is larger, and the set coefficient kb is multiplied by the back shift amount BS.

Then, the cross point position is shifted backwards from the eye (the attention point) as the above set back shift amount BS increases, and the 3D processing is performed (step S18).

In the embodiment, the lenticular system is employed as the stereoscopic display system. Specifically, in the 3D processing, assuming that the parallax amount of the eye position is EP, the back shift amount is BS, and the coefficient by which the back shift amount is multiplied is kb, the final image shift amount CPP is calculated by the following Expression (1). Here, it is preferable to shift the display position of the right image GR on the LCD 2 in the leftward direction by the calculated CPP.

$$CPP = EP + BS \times kb \tag{1}$$

In addition, when a system other than the lenticular system is employed as the stereoscopic display system, it is preferable to appropriately change processing in accordance with each system such that a principal object is set as the cross point.

Finally, the stereoscopic image generated in the above-mentioned manner is displayed on the LCD 2, and the processing ends.

As described above, when the farther eye of the left and right eyes is set as the attention point, an area of the object projected forward more increases. Therefore, it is possible to obtain an appropriate stereoscopic image which has a high stereoscopic effect.

In addition, the image processing apparatuses 1 according to the first and second embodiment may be applied to a pantoscopic photographing apparatus having plural photographing sections. In this case, by immediately displaying the plural images acquired by photography and adjusting the stereoscopic effect thereof, it is possible to record the images in the recording medium 4.

The apparatuses 10 according to the embodiments has hitherto been described, but another embodiment of the invention is a program for making a computer function as the image processing section 25, the recording control section 21, and the display control section 26 so as to execute processing shown in FIGS. 3 and 13. Further, another embodiment of the invention is a computer-readable recording medium storing such a program.

What is claimed is:

1. An image processing apparatus that generates a stereoscopic image by performing parallax adjustment on a plurality of images which are viewed from different observation points, the image processing apparatus comprising:
    a face detection section that detects a face from each image;
    an attention point detection section that detects a prescribed attention point serving as a provisional cross point position from the face; and
    a cross point position adjustment section that shifts the cross point position backwards from the attention point as the percentage of the image occupied by the face increases,
    wherein the cross-point position adjustment section has a back-shift adjustment section which performs adjustment to reduce the amount of shifting back as the number of pixels of positions nearer than the attention point increases.

2. The image processing apparatus according to claim 1, further comprising a distance calculation section that calculates a distance in a depth direction on the basis of a parallax amount between the plurality of images for each pixel of the images.

3. The image processing apparatus according to claim 2, wherein the back-shift adjustment section gives more weight to the pixel which is closer to the center of the image when determining the number of pixels of the positions nearer than the attention point.

4. The image processing apparatus according to claim 2, wherein the back-shift adjustment section gives more weight to the pixel which is closer to the center of the face when determining the number of pixels of the positions nearer than the attention point.

5. The image processing apparatus according to claim 1, wherein the attention point is at an eye.

6. The image processing apparatus according to claim 5, wherein the attention point is at a farther eye in the backward direction among the left and the right eyes.

7. The apparatus of claim 1, wherein shifting the cross point backwards increases a relative distance between the cross point and the attention point on the face.

8. An image processing method of setting a prescribed point, which corresponds to each of a plurality of images viewed from different observation points, as a cross point and generating a stereoscopic image by performing parallax adjustment on the plurality of images so as to minimize parallax at a position of the corresponding cross point, the image processing method comprising:
    detecting a face from each image;
    detecting a prescribed attention point serving as a provisional cross point position from the face; and
    shifting the cross point position backwards from the attention point as the percentage of the image occupied by the face increases,
    wherein an amount of the shifting the cross point position backwards is adjusted to reduce as the number of pixels of positions nearer than the attention point increases.

9. A non-transitory computer-readable medium encoded with a program for causing a computer to execute an image processing method of setting a prescribed point, which corresponds to each of a plurality of images viewed from different observation points, as a cross point and generating a stereoscopic image by performing parallax adjustment on the plurality of images so as to minimize parallax at a position of the corresponding cross point, the image processing method comprising:
    detecting a face from each image;
    detecting a prescribed attention point serving as a provisional cross point position from the face; and
    shifting the cross point position backwards from the attention point as the percentage of the image occupied by the face increases,
    wherein an amount of the shifting the cross point position backwards is adjusted to reduce as the number of pixels of positions nearer than the attention point increases.

* * * * *